(12) United States Patent
Umebayashi

(10) Patent No.: US 6,819,441 B2
(45) Date of Patent: Nov. 16, 2004

(54) DIGITAL INTEGRATED APPARATUS AND IMAGE CONTROL SYSTEM

(75) Inventor: Akito Umebayashi, Shiga-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/038,139

(22) Filed: Mar. 11, 1998

(65) Prior Publication Data

US 2001/0012119 A1 Aug. 9, 2001

(30) Foreign Application Priority Data

Mar. 12, 1997 (JP) .............................. 9-057275

(51) Int. Cl.$^7$ .......................... G06F 15/00; H04N 1/00
(52) U.S. Cl. ...................... 358/1.15; 358/403; 709/217; 379/100.09
(58) Field of Search ............................... 358/1.15, 402, 358/403, 407, 408, 434, 435, 442, 443, 438, 468; 709/201, 202, 203, 206, 217, 218, 219; 379/93.02, 100.08, 100.09, 100.12

(56) References Cited

U.S. PATENT DOCUMENTS

| | | | | |
|---|---|---|---|---|
| 5,521,719 A | * | 5/1996 | Yamada ...................... 358/438 |
| 5,675,507 A | * | 10/1997 | Bobo, II ..................... 709/206 |
| 5,758,324 A | * | 5/1998 | Hartman et al. ............... 705/1 |
| 5,760,917 A | * | 6/1998 | Sheridan ..................... 358/442 |
| 5,764,866 A | * | 6/1998 | Maniwa ...................... 358/1.15 |
| 5,893,908 A | * | 4/1999 | Cullen et al. .................. 707/5 |
| 5,911,044 A | * | 6/1999 | Lo et al. ..................... 709/203 |
| 5,913,088 A | * | 6/1999 | Moghadam et al. ......... 396/311 |
| 5,974,202 A | * | 10/1999 | Wang et al. ................. 382/306 |
| 5,978,477 A | * | 11/1999 | Hull et al. ................... 358/403 |
| 6,017,157 A | * | 1/2000 | Garfinkle et al. ............ 396/639 |
| 6,115,739 A | * | 9/2000 | Ogawa et al. ............... 709/215 |
| 6,188,766 B1 | * | 2/2001 | Kocher ........................ 380/246 |

FOREIGN PATENT DOCUMENTS

| | | |
|---|---|---|
| EP | 0 751 672 A2 | 1/1997 |
| EP | 0 751 672 A3 | 1/1997 |
| EP | 0 756 414 A3 | 1/1997 |
| EP | 0 756 414 A2 | 1/1997 |
| JP | 06103208 | 4/1994 |
| JP | 06181503 | 6/1994 |

OTHER PUBLICATIONS

Mikio Tanaka et al., "Image Communication Services Using JPEG", NEC Research & Development, vol. 35, No. 1, Jan. 1994, pp. 108–114.

Victor L. Callaghan et al., "Structures and metrics for iamge storage and interchange", Journal of Electronic Imaging, vol. 2, No. 2, Apr. 1993, pp. 126–137.

\* cited by examiner

*Primary Examiner*—Edward Coles
*Assistant Examiner*—Joseph R. Pokrzywa
(74) *Attorney, Agent, or Firm*—McDermott Will & Emery LLP

(57) ABSTRACT

A digital integrated apparatus and an image control system capable of registering images with simple operation. As a start button provided in the digital integrated apparatus is turned on, image data is generated by an image input element, while attribute information is generated by an attribute information generator. These image data and attribute information are transmitted by a transfer element to a network address stored in an address storing device, and are stored in a storing element of a service device. These image data and attribute information are made public by a publicizer of the server device, and submitted to perusing by a perusing element of a peruser device.

13 Claims, 19 Drawing Sheets

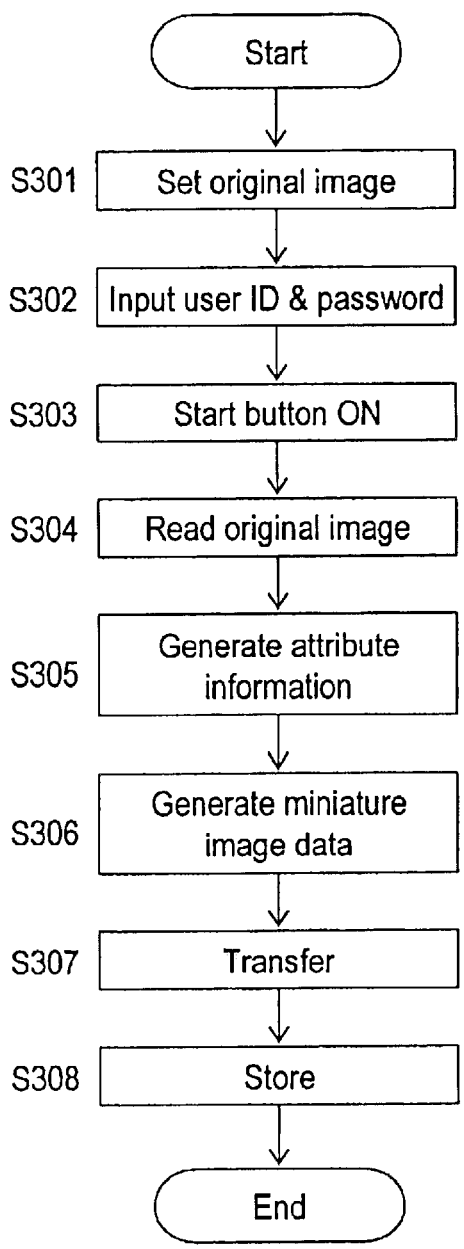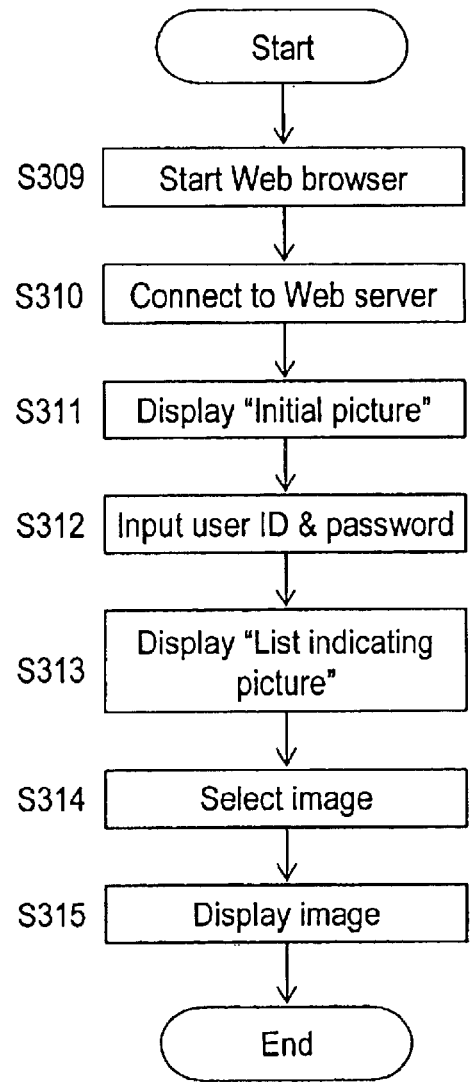

| Machine ID | Image ID | Date | Size | Sheet | Address of storage |
|---|---|---|---|---|---|
| 001 | 001 | 1998/1/15 | 28K | 2 | Pointer to image file |
| 001 | 002 | 1998/1/16 | 30K | 3 | ″ |
| 002 | 001 | 1998/1/17 | 8K | 1 | ″ |
| 003 | 001 | 1998/1/18 | 20K | 1 | ″ |

| Machine ID | Image ID | User ID | Pass word | Access right information | Date | Size | Sheet | Address of storage |
|---|---|---|---|---|---|---|---|---|
| 001 | 001 | 001 | 012 | 1 | 1998/1/15 | 28K | 2 | Pointer to image file |
| 001 | 002 | 002 | 345 | 2 | 1998/1/16 | 30K | 3 | ″ |
| 002 | 001 | 003 | 678 | 3 | 1998/1/17 | 8K | 1 | ″ |
| 003 | 001 | 004 | 910 | 1 | 1998/1/18 | 20K | 1 | ″ |

| Machine ID | Network address |
|---|---|
| 001 | 123.456.789.101. |
| 002 | 123.456.789.102. |
| 003 | 123.456.789.103. |

| Machine ID | User ID | Password |
|---|---|---|
| 001 | 001 | 123 |
| 001 | 002 | 345 |
| 002 | 001 | 567 |

DIGITAL INTEGRATED APPARATUS AND IMAGE CONTROL SYSTEM

FIELD OF THE INVENTION

The present invention relates to a digital integrated apparatus and an image control system.

BACKGROUND OF THE INVENTION

FIG. 22 is an explanatory drawing of a conventional typical image control system, the construction of which is explained hereafter together with its actions.

First, in the state where a original image is set on a scanner 101, (the user) starts an image data acquisition means 104 working on a personal computer 103, and issues a command for reading original image. This image data acquisition means 104 transmits an operating command to the scanner 101 through a SCSI cable 102, and the scanner 101 reads the image in units of line, units of fixed block or units of page by driving the image sensor.

The image data generated with this reading is delivered to said image data acquisition means 104 through the SCSI cable 102, and then stored in the hard disc of the personal computer 103.

In the case where there exist a plural number of sheets as original image set on the scanner 101, an auto document feeder (ADF) provided on the scanner 101 automatically feeds the sheets for reading the following original image successively.

Next, the image data stored in the hard disc of said personal computer 103 is transmitted to a server device 200 through a trunk network 400, together with attribute information such as image size, image reading date & time, etc. of that image data.

The server device 200 stores the acquired image data on the hard disc, and registers said attribute information supplemented by pointer information indicating the address of storage, in the data base 201.

As described above, by integrally controlling the image data generated on said personal computer 103 with the server device 200, it becomes possible to display said image data by using a display program 301 of other personal computer 300 connected to the trunk network 400.

However, to register image on a conventional image control system, the user had to execute separately, after obtaining an image from the scanner, an operation of transmitting the acquired image data to the server device 200.

This transmission, which required such operations as selecting the image data file to be transmitted from among the files stored on the hard disc, specifying the server device 200 as destination of transfer, etc., presented a problem of complicated operations by the user.

The object of the present invention, proposed in view of said conventional circumstances, is to provide a digital integrated apparatus and an image control system capable of registering images with simple operation.

SUMMARY OF THE INVENTION

The present invention adopts the means described below for achieving said object. Namely, as shown in FIG. 1, in the present invention, as the start button 14c provided in the digital integrated apparatus 10 is turned on, image data is generated by an image input means 12a while attribute information is generated by an attribute information generating means 13. These image data and attribute information are transmitted, by a transfer means 16, to a network address stored in an address storing means 17, and are stored in a storing means 27 of a server device 20. These image data and attribute information are made public by a publicizing means 22 of the server device 20, and submitted to perusal by a perusing means 33 of a peruser device 30.

Said processing of publication and perusal is made possible as a publicizing means 22 publicizes a list corresponding to the respective image data and the perusing means 33 transmits, to said peruser device 30, the image data corresponding to the one specified from among that list.

Said attribute information includes such information as machine ID unique to each digital integrated apparatus connected to the network, image ID unique to each image data, user ID unique to each user, access right to image data, etc.

Moreover, a miniature image generating means 18 for generating miniature image data of image data is provided on said digital integrated apparatus 10 side. And the transfer means 16 transmits this miniature image data together with image data and attribute information and the attribute information includes pointer information indicating the address of storage of said miniature image data. Thus it becomes possible to display this miniature image on said list.

Furthermore, a characteristics extracting means 23 for extracting data from prescribed position of the image data is provided on said server device 20 side. In addition, the attribute information includes pointer information indicating the address of storage of the characteristic image generated by said characteristics extracting means 23. This makes it possible to display characteristic images on said list. It is also possible to construct (this image control system) in a way to provide, on said digital integrated apparatus 10 side, a characteristic image synthesizing means 18 for combining specific image at said prescribed position of image data.

The same effects may be obtained also with a construction in which said storing means is provided on said digital integrated apparatus 10 side, in place of the storing means 27 provided on said server device 20 side.

BRIEF DESCRIPTION OF THE DRAWINGS

FIGS. 7(a), 7(b) are flow charts in the third embodiment of the present invention.

EMBODIMENTS OF THE INVENTION

Embodiments of the present invention will be explained in detail based on drawings hereafter.

Figure 9:
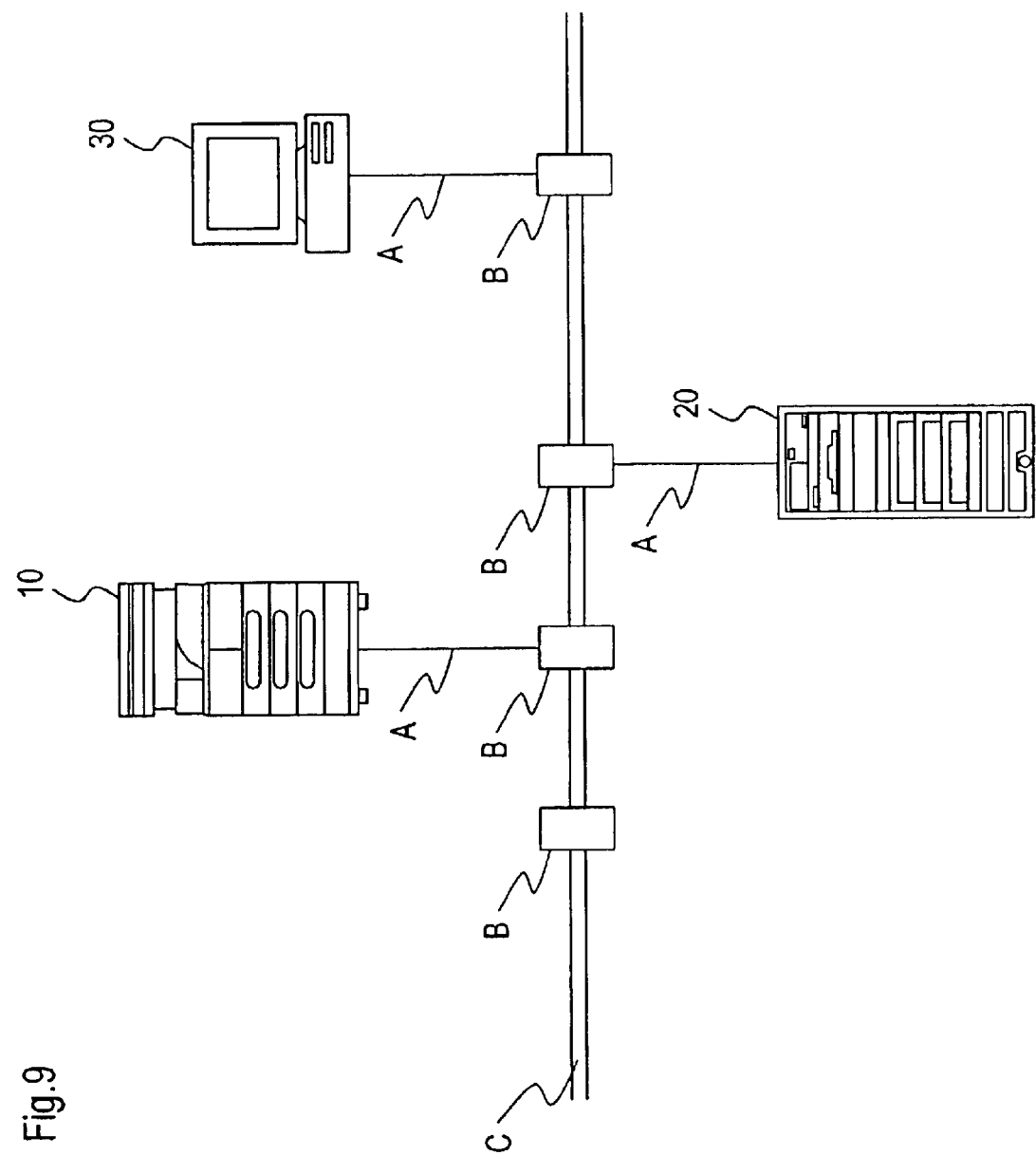
FIG. 9 is a network construction drawing of the present invention.

FIG. 9 indicates a network construction drawing of the image control system according to the present invention. A digital integrated apparatus 10, a server device 20 and a peruser device 30 are connected to a trunk line C such as Ethernet, etc. through a transmission line A and a connector B such as transceiver, etc.

Said digital integrated apparatus 10 is an apparatus for realizing space saving, by integrating digital image equipment such as facsimile, printer, etc. on the basis of a digital copying machine. Moreover, said server device 20 is a device for not only controlling the image data generated by the digital integrated apparatus 10 but also publicizing this image data on the peruser device 30, while said peruser device 30 is a device for perusing the image data publicized by the server device 20. These server device 20 and peruser device 30 can be constructed with personal computer, work station, etc., for example.

In the embodiments indicated hereafter, said processing of publication and perusal is made possible with the adoption of WWW (World Wide Web). This WWW is, as indicated in RFC (Request For Comments) 2068, 1945, etc., a mechanism for publicizing various kinds of information existing scatteringly on the network, as information accessible by anybody, and the information publicized by WWW server is accessible through a software called Web browser.

The construction of the respective devices will be explained hereafter, on the assumption that a WWW server works on the server device 20 and that a Web browser works on the peruser device 30.

While a construction using LAN is presented as example here, the network construction is not limited to such construction, and it may also be a construction using a public telephone network, a high-speed digital network such as ISDN, or a wireless network.

(Embodiment 1)

Figure 1:
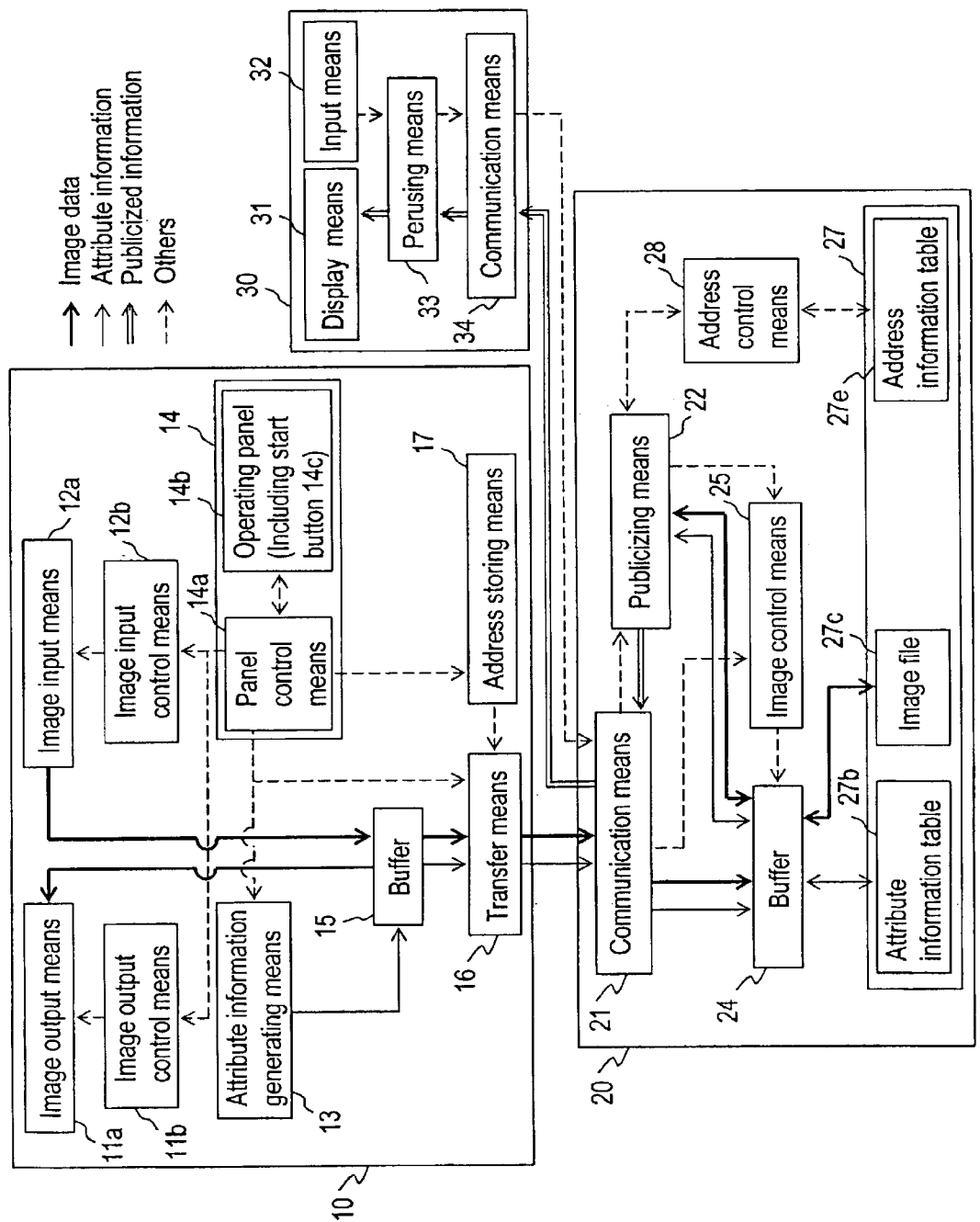
FIG. 1 is a schematic functional block diagram of the first embodiment of the present invention.
Figure 5:
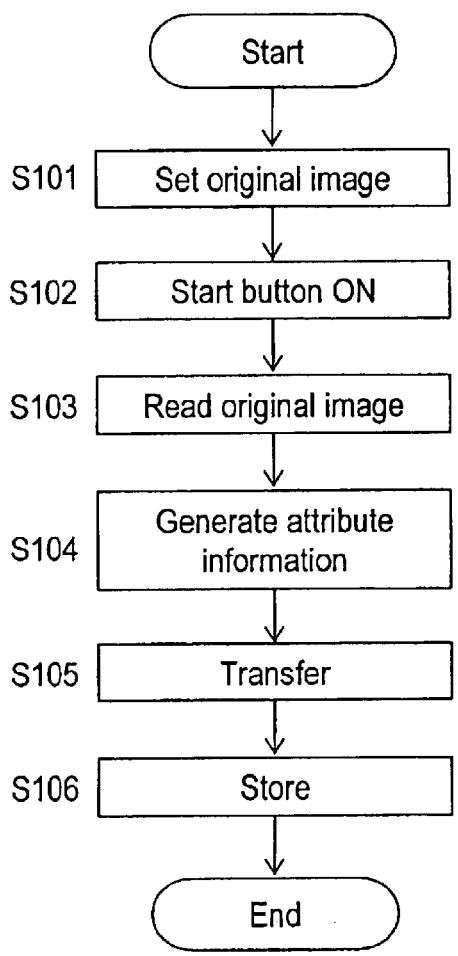
FIGS. 5(a), 5(b) are flow charts in the first embodiment of the present invention.
Figure 5:
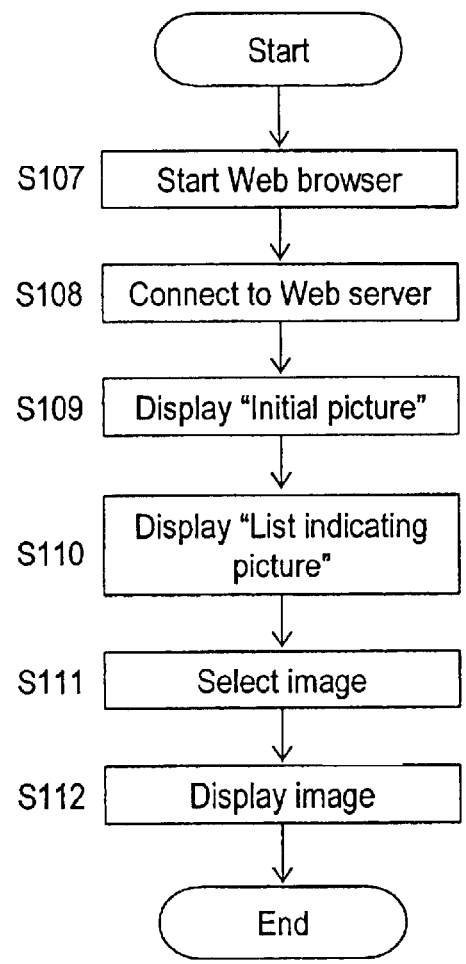

FIG. 1 is a schematic functional block diagram of the image control system in the first embodiment of the present invention, while FIGS. 5(a), 5(b) are flows charts indicating its operating procedure. The construction of this embodiment will be explained together with its operating procedure hereafter.

<Registration>

First, the user sets a original image which he wishes to register on an image input means 12a such as digital scanner, etc., for example, provided on the digital integrated apparatus 10 (FIG. 5(a), step S101).

Figure 10:
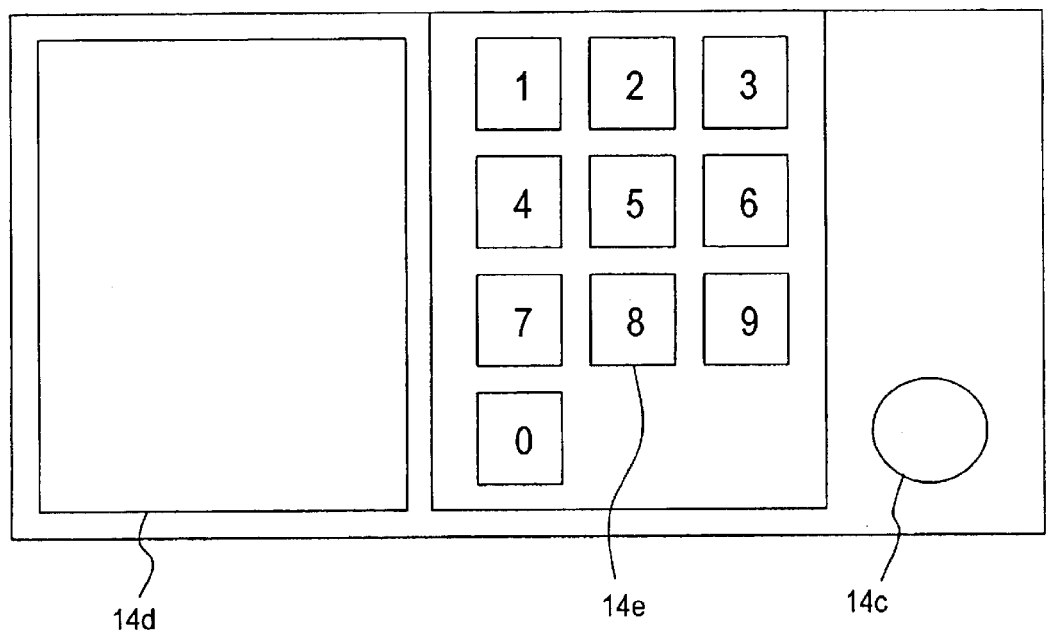
FIG. 10 is an explanatory drawing of the operating panel.

Next, when the user pressed the start button 14c contained in the operating panel 14b indicated in FIG. 10, this instruction information is notified to the panel control means 14a. Upon receiving the above instructions the panel control means 14a requests reading of original image to the image input control means 12b controlling the driving of the image input means 12a on one hand and informs the presence of a request for registration of image data to the attribute information generating means 13 and the transfer means 16 on the other hand (FIG. 5(a), step S102).

The image input control means 12b, upon receipt of said request for registration, instructs reading of original image to the image input means 12a, and the image input means 12a reads the original image and stores digitally converted image data in the buffer 15 (FIG. 5(a), step S103).

Moreover, the attribute information generating means 13, upon receipt of said notification of request for registration, first issues an image ID composed of a 3-digit figure, for example, and then stores information, which comprise machine ID to be described later and this image ID and supplementary information such as "date of registration", "image size", etc. (hereinafter referred to as "attribute information") of the generated image data, in the buffer 15 (FIG. 5(a), step S104).

Said image ID, which is a unique number issued by the attribute information generating means 13 when the image data is generated, may be considered as a unique number among the image data generated in one same digital integrated apparatus 10.

Furthermore, the transfer means 16, upon receipt of said notification of request for registration, refers to the address storing means 17 and transmits the image data and the attribute information stored in the buffer 15 to the network address stored in this address storing means 17 (FIG. 5(a), step S105).

Here, it is presupposed that the network address of the server device 20 is stored in said address storing means 17. Therefore, said transfer is made to the server device 20. The storing method of this network address will be explained in detail later.

The communication means 21 of the server device 20 stores the image data and the attribute information, received from said digital integrated apparatus 10, in the buffer 24, and notifies the image control means 25 of the presence of received data. The image control means 25, upon receipt of this notification, first stores the image data stored in said buffer 24 as image file 27c in a storing means 27 such as magnetic disc, optical disc, magneto-optical disc, etc. After that, the image control means 25 adds, to the attribute information stored in said buffer 24, pointer information such as pass, etc. of said image file 27c, for example, showing the address of storage of said image data, and registers it in the attribute information table 27b on the storing means 27 (FIG. 5(a), step S106).

Figure 15:
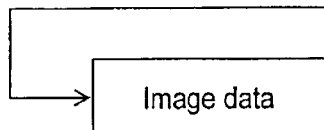
FIG. 15 is an example of construction of the attribute table in the first embodiment of the present invention.

Said attribute information table 27b is constructed in a way to store information comprising the attribute information generated on the digital integrated apparatus 10 side and said supplemented pointer information, as shown in FIG. 15, for example.

The machine ID contained in said attribute information is a number controlled by the address control means 28 on the address information table 27e (see FIG. 19) provided in the storing means 27 of the server device 20, and is a unique number of the digital integrated apparatus 10 connected to the network. In this system, this machine ID and the image ID are controlled in a way to cope with a construction provided with a plurality of digital integrated apparatuss 10. Namely, even in the case of a system construction having a plural number of digital integrated apparatuss 10, identification of image data is possible, because the information comprising said machine ID and image ID is a unique number and the respective image data transferred to the server device 20 are furnished with an ID different from one another.

In the explanation given above, there is an operation of supplementing machine ID when attribute information is generated by attribute information generating means 13 of the digital integrated apparatus 10, but there is no particular limitation to the kind of medium of this machine ID information. Namely, the machine ID may be stored in the address storing means 17 such as said ROM, etc., or may be stored in other specially provided storing means such as magnetic disc, optical disc, magneto-optical disc, etc.

As described above, in this image control system, (the user) can transmit generated image data to the server device 20, and store it in the storing means 27 of the server device 20, by simply pressing the start button provided on the digital integrated apparatus 10.

And, this image data can be publicized by a publicizing means 22 such as WWW server, etc. working on the server device 20, and submitted to perusal by a perusing means 33 such as Web browser, etc. working on the peruser device 30.

Explanation will be given hereafter on "perusal" for perusing said publicized image data, according to the flow chart in FIG. 5(b).

<Perusal>

First, the user starts the perusing means 33 such as Web browser, etc. on the peruser device 30, and establishes connection to the server device 20 (FIG. 5(b), steps S107 to S108).

In the case where said connection was successful, the publicizing means 22 such as WWW server, etc. working on the server device 20 transmits, to the peruser device 30, data of an image generally called home page which is initially displayed at the perusing means 33. This data is displayed on a display means 31 of the perusing means 33 in an image as shown in FIG. 14(a) for example (FIG. 5(b), step S109).

Figure 14:
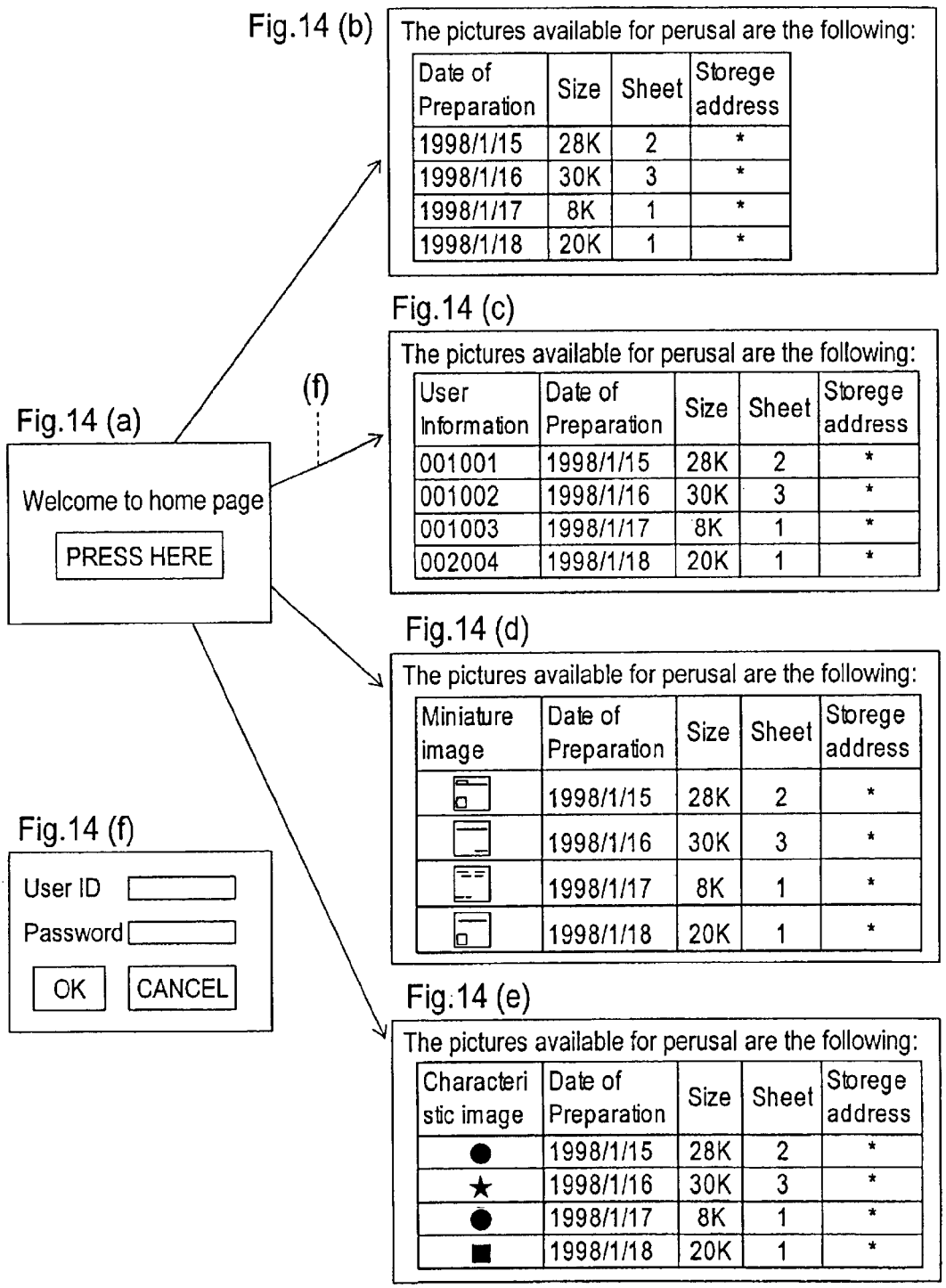
FIGS. 14(a), 14(b), 14(c), 14(d), 14(d), 14(f) are explanatory drawings of the display picture in the peruser device.

Next, as the user selects the "PRESS HERE" button as shown in FIG. 14(a) at the perusing means 33, a data requesting acquisition of list is transmitted from the perusing means 33 to the publicizing means 22, and the publicizing means 22, upon receipt of this request, prepares list information based on the data stored on the attribute information table 27b, and transmits this list information to the perusing means 33.

Said processing of preparation of list information can be made with the use of CGI (Common Gateway Interface), for example, but explanation on it will be omitted here because its technical contents are widely known already.

The list information transmitted to said peruser device 30 is displayed on the display means 31 of the perusing means 33 in an image as shown in FIG. 14(b) (FIG. 5(b), step S110).

The user guesses the image data based on the information such as "date & time of preparation", "number of sheets", etc. displayed on this list, and selects an image which he wishes to peruse by clicking the "address of storage" column for example indicated in FIG. 14(b) (FIG. 5(b), step S111).

The construction of the list is not limited to the construction indicated in FIG. 14(b) but may be a construction made by adding machine ID and image ID for example. Moreover, the operation of selecting the image to be perused is not limited to clicking of the "address of storage" column for example but said selection may also be made by clicking of the "date & time of preparation" column for example.

With said selecting operation, a request for acquisition of image data is given from the perusing means 33 to the publicizing means 22, and the publicizing means 22 instructs take-out of the requested image data to the image control means 25. The image file 27c taken out from the storing means 27 by the image control means 25 is transmitted, by the publicizing means 22, to the peruser device 30 and is displayed on the display means 31 (not limited to Web browser but may also be an external image display program) (FIG. 5(b), step S112).

While the above explanation contains an operation of acquiring image data stored in the storing means 27 with the image control means 25, this operation is an operation which can be easily realized as a matter of course, as it is apparent from the fact that the request for acquisition of image data the perusing means 33 is made based on a list (this list is prepared, as described earlier, based on the information controlled on the attribute information table 27b).

As described above, according to this image control system, image data registered in the storing means 27 of the server device 20 can be perused by using a Web browser.

The above explanation is based on the assumption that a network address corresponding to the server device 20 is stored in the address storing means 17 of the digital integrated apparatus 10. With the present invention, adaptation (change of function) can be made with simple operation even in the case of any change to the network address of the server device 20. Here is an explanation of the operation for such adaptation.

<Change of Function>

The digital integrated apparatus 10 of the present invention is provided with an operating panel 14b (operating means 14) composed of a start button 14c, a touch panel 14d, ten keys 14e, etc. indicated in FIG. 10, and the user can instruct and input various kinds of operation by using this operating panel 14b.

Figure 11:
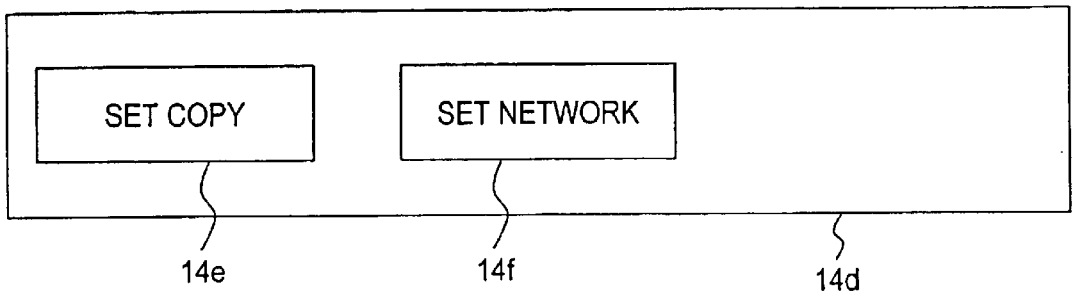
FIGS. 11(a), 11(b), 11(c) are explanatory drawings of the touch panel in the first embodiment of the present invention.
Figure 11:
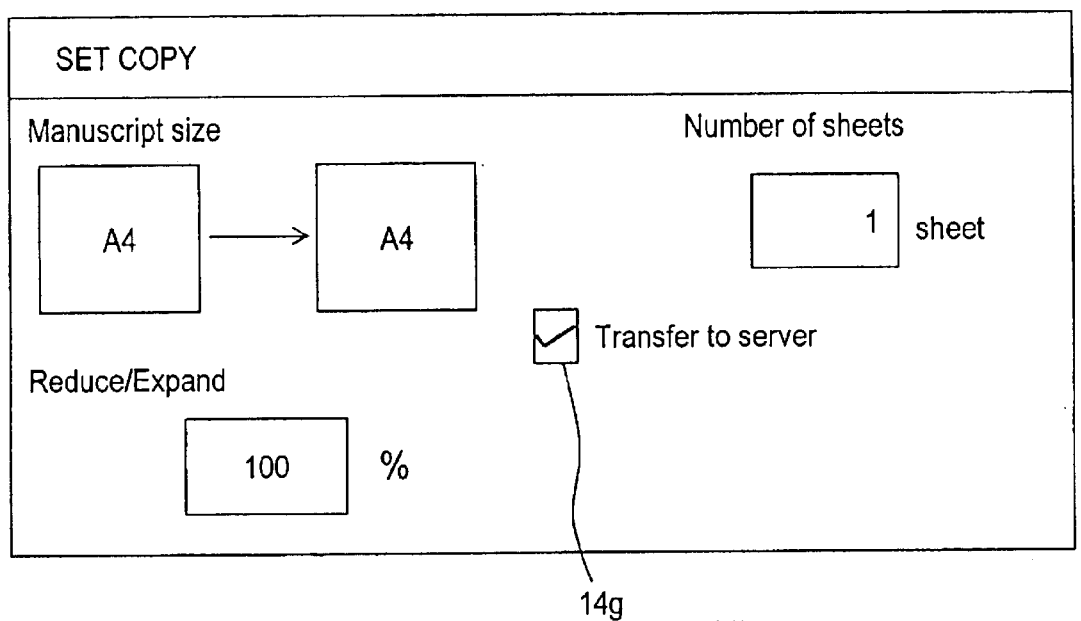
Figure 11:
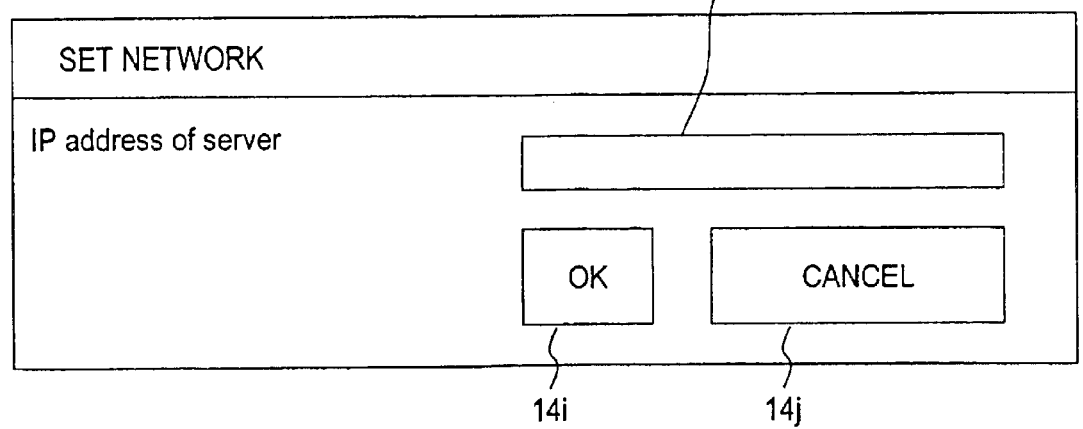

Said touch panel 14d is an input device with which the user can instruct and input operation by clicking a menu displayed on the panel with a finger or a pen, etc., and on the initial picture of the touch panel 14d in this embodiment are displayed a "SET COPY" button 14e and a "SET NETWORK" button 14f as indicated in FIG. 11(a).

When the "SET COPY" button 14e indicated in FIG. 11(a) is pressed down, the copy setting picture indicated in FIG. 11(b) is displayed on the touch panel 14d. The transfer check box 14g located at a center right position of the picture is a check box for setting whether the digital integrated apparatus 10 concerned works as a digital integrated apparatus executing registration on said server device 20 or not.

In the case where said transfer check box 14g is checked, the digital integrated apparatus 10 concerned works as a digital integrated apparatus for executing said registration. Namely, information to the effect that the transfer check box 14g has been checked is delivered to the panel control means 14a, and the panel control means 14a informs it to the transfer means 16 to execute transfer of the image data to be generated thereafter. The subsequent operating steps of the transfer means 16 are as indicated in the explanation of said registration.

On the other hand, in the case where said transfer check box 14g is not checked, (the digital integrated apparatus 10 concerned) does not make any transfer to the server device 20 but executes a copying operation of the original image set on the image input means 12a. Namely, the original image set on the image input means 12a is digitally input in the image input means 12a when the start button 14c is pressed, and is output from an image output means 11a such as printer, etc. The setting such as "original image size", "output sheet size", "number of sheets", "reduce/expand", etc. regarding this copying operation can be made in the copy setting picture indicated in FIG. 11(b). (The information of setting made in this drawing is informed to the image output control means 11b controlling the driving of the image output means 11a through the panel control means 14a.).

Moreover, as the "SET NETWORK" button 14f indicated in FIG. 11(a) is pressed down, the network setting picture indicated in FIG. 11(c) is displayed on the touch panel 14d. In this picture, the user sets the network address of the destination for the transfer of image data. Namely, the user inputs the network address of the server device 20 in the address input column 14h by using the ten keys 14e, presses down the "OK" button 14i. The input address information is delivered to the panel control means 14a, and the panel control means 14a stores this address information in an address storing means 17 such as ROM, etc., for example. In case any value unacceptable as network address is input, an alarm message to that effect is displayed on the picture and requests the user to input a correct value.

As described above, according to the digital integrated apparatus 10 of the present invention, adaptation can be made with simple operation using the operating panel 14b even in the case of any change to the network address of the server device 20.

(Embodiment 2)

Figure 2:
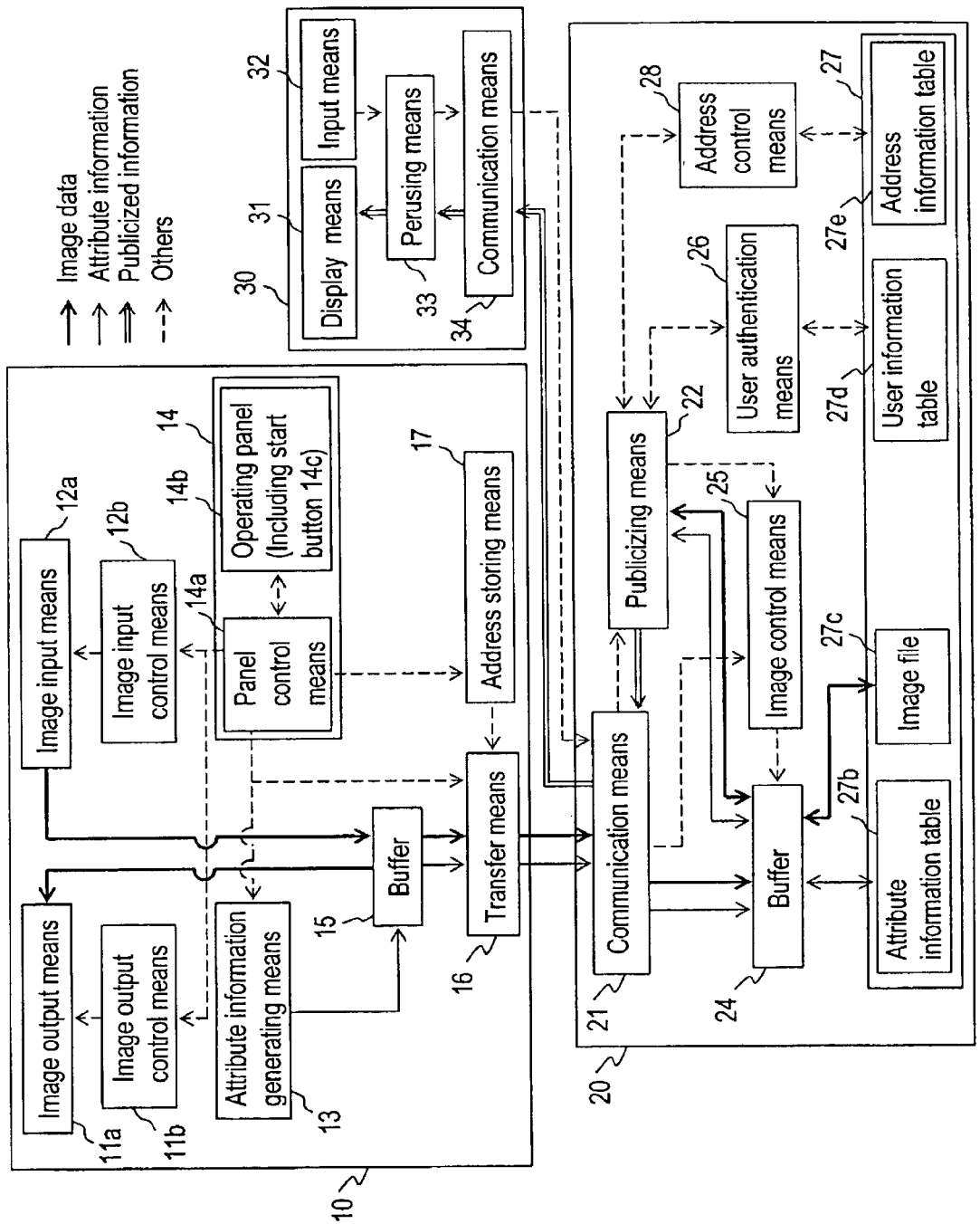
FIG. 2 is a schematic functional block diagram of the second embodiment of the present invention.

In this embodiment, (the image control system) has a construction provided with a user authentication mechanism in addition to the construction indicated in said first embodiment. Explanation will be given hereafter only on points different from those in the first embodiment, by using FIG. 2 and FIGS. 6(a), 6(b).

Figure 12:
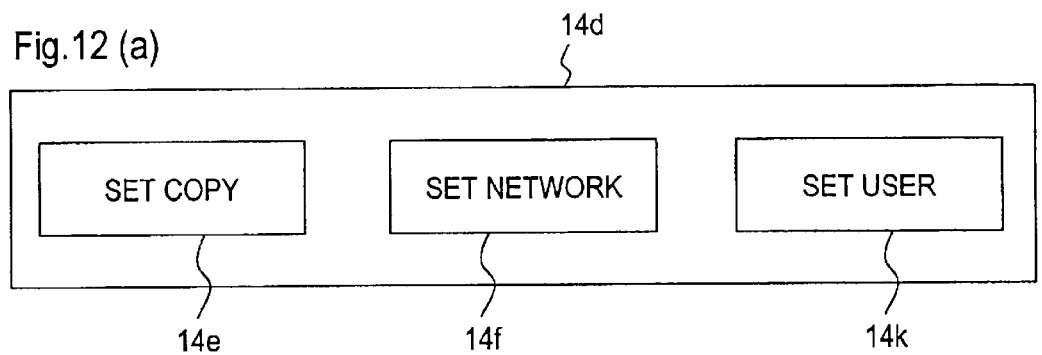
FIGS. 12(a), 12(b) are explanatory drawings of the touch panel in the second embodiment of the present invention.
Figure 12:
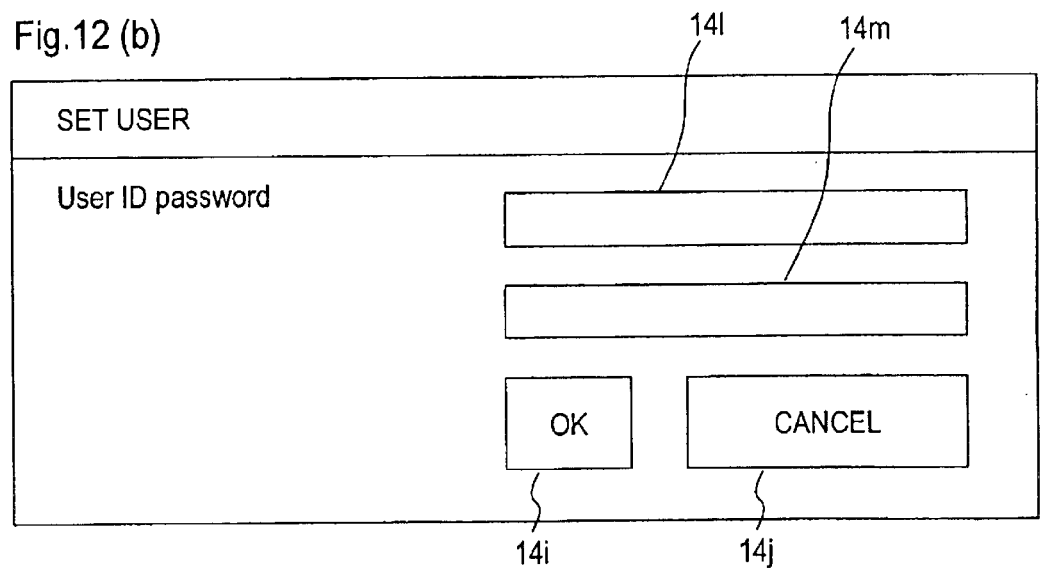

First, in the initial picture of the touch panel 14d is displayed the "SET USER" button 14k as shown in FIG. 12(a), in addition to the "SET COPY" button 14e and the "SET NETWORK" button 14f indicated in said first embodiment.

In this embodiment, after setting the original image to be registered on the image input means 12a, the user sets up this user setting before pressing the start button 14c.

As said "SET USER" button 14k is pressed down, the user setting picture as shown in FIG. 12(b) is displayed on the touch panel 14d. In this picture, the user sets a user ID and a password of his own assigned in advance. Namely, the user inputs the user ID in the user ID input column 14l and the password in the password input column 14m by using ten keys 14e, and presses down the "OK" button 14i (FIG. 6(a), steps S201 to S202).

Figure 3:
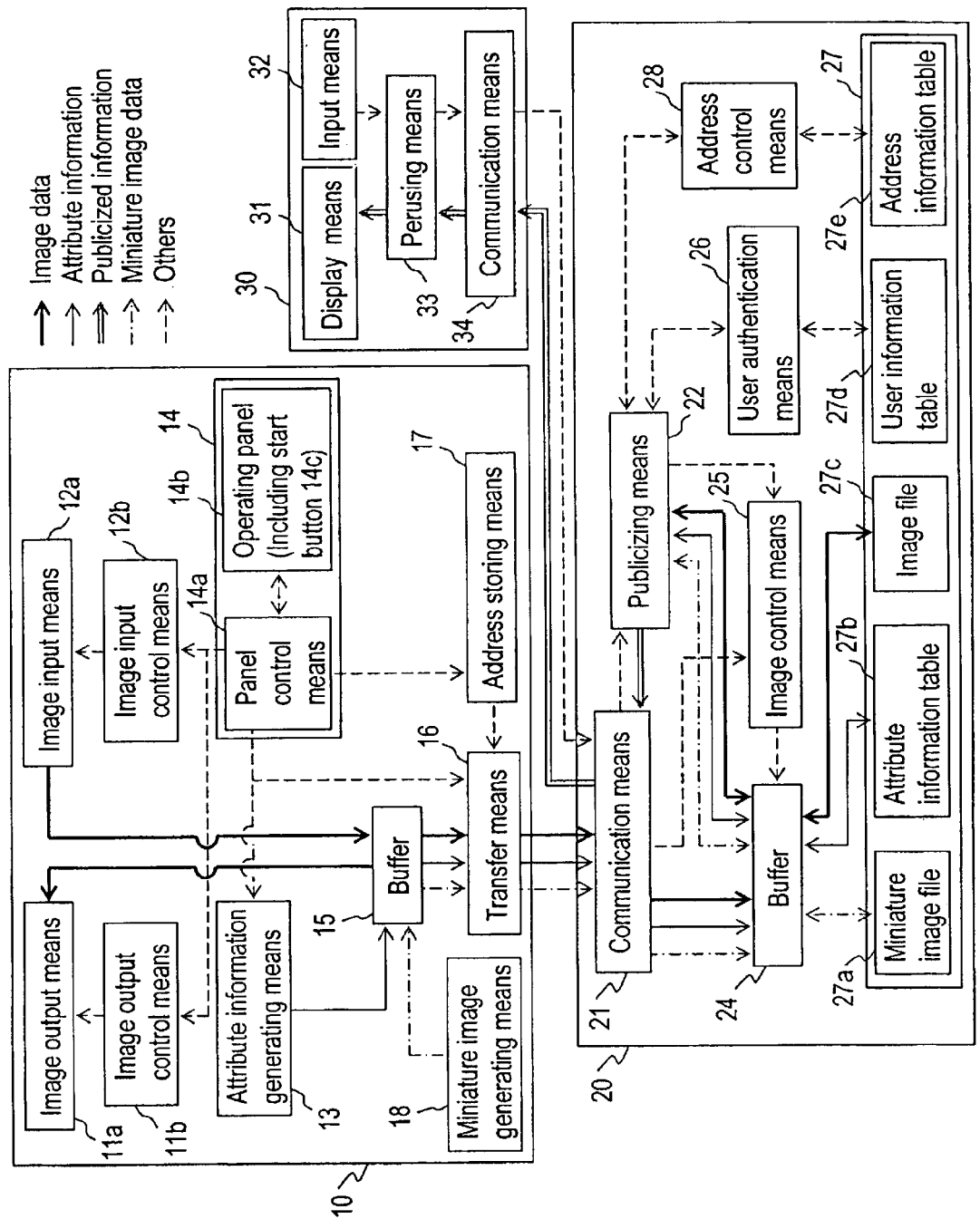
FIG. 3 is a schematic functional block diagram of the third embodiment of the present invention.

Said "user ID and password of his own assigned in advance" refer to the user ID and password assigned on the user information table 27d (see FIG. 20) of the text file, etc., for example, provided in the storing means 27d of the server device 20. By editing this user information table 27d by using an editor, etc., the user can make issuance, deletion, etc. of user ID. The user authentication means 26 indicated in FIG. 3 performs user authentication to be described later, by referring to this user information table 27d.

Here, as a method for inputting said user ID, it is all right to use such method as reading a magnetic card in which is recorded said user ID, by providing a magnetic card reader on said operating means 14.

The input user ID and password information is held in the panel control means 14a and, when the start button 14c is pressed, informed to the attribute information generating means 13. The attribute information generating means 13 generates attribute information with a construction in which this user ID and password information is added to the attribute information indicated in said first embodiment (FIG. 6(a), steps S203 to S204 to S205).

Figure 6:
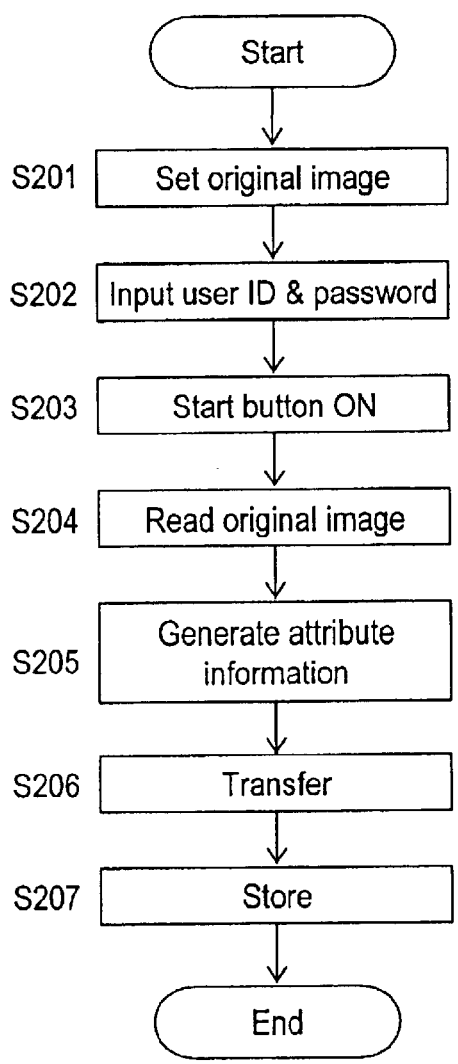
FIGS. 6(a), 6(b) are flow charts in the second embodiment of the present invention.
Figure 6:
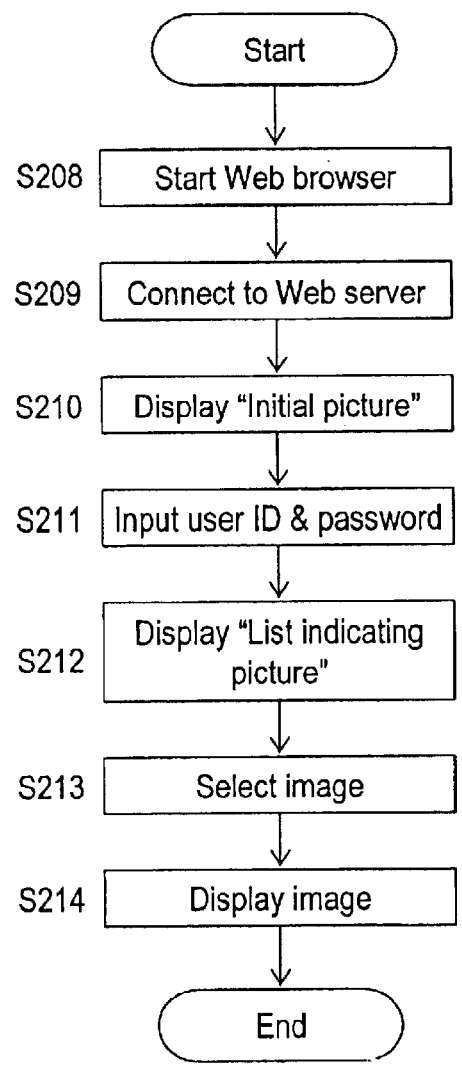

The generated attribute information are, in the same way as in said first embodiment, stored in the buffer 15, transferred to the server device 20 together with the image data, and stored in the storing means of the server device 20 (FIG. 6(a), steps S206 to S207).

Figure 16:
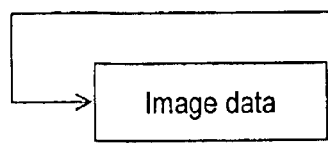
FIG. 16 is an example of construction of the attribute table in the second embodiment of the present invention.

The construction of the storing means 27d of the server device 20 is also realized as a construction in which said user ID and password information is added as shown in FIG. 16, in the same way as said attribute information. (The "access right information" indicated in that drawing will be described later.).

Next, explanation will be given on the perusal in this embodiment. In the same way as in said first embodiment, as the perusing means 33 is started and the connection to the publicizing means 22 is established successfully, the initial picture indicated in FIG. 14(a) is displayed on the display means 31 of the perusal device 30 and, when the "PRESS HERE" button is clicked, a list indicating picture is displayed (FIG. 6(b), steps S208~S212).

Figures 19, 20, 21:
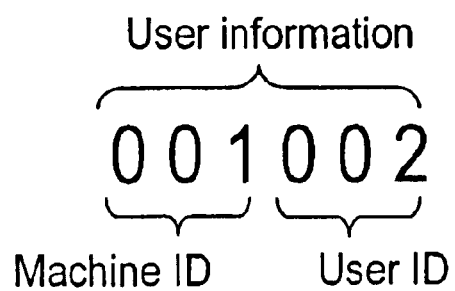
FIG. 19 is an example of construction of the address information table.
FIG. 20 is an example of construction of the user information table.
FIG. 21 is an explanatory drawing of user information.
Figure 22:
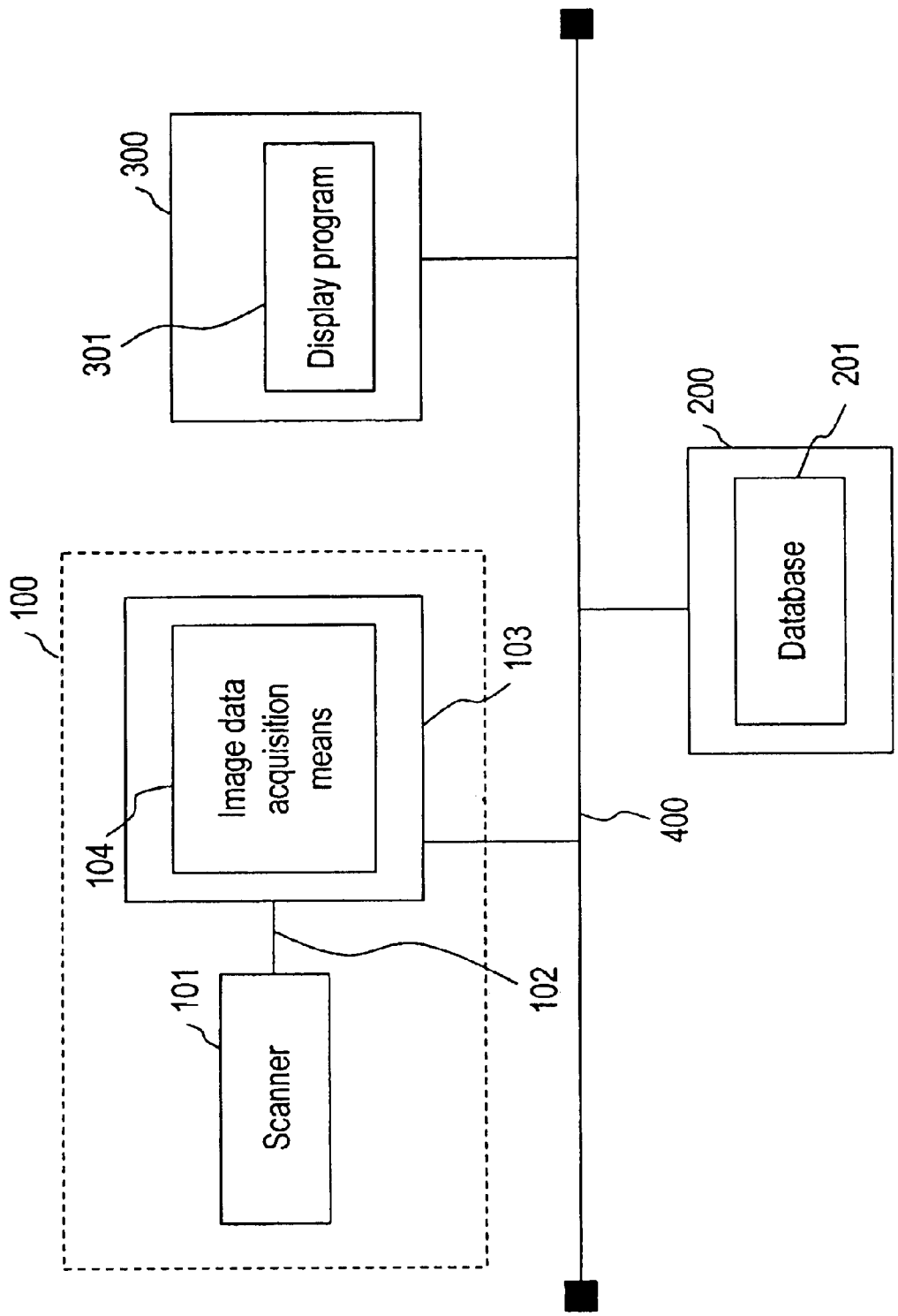
FIG. 22 is an explanatory drawing of a conventional image processing system.

To the list displayed in this list indicating picture is added, as shown in FIG. 14(c), user information (user information as meant here refers to the information including both machine ID and user ID, as shown in FIG. 21), in addition to the construction indicated in said first embodiment. Therefore, the user can find out the image data prepared by himself easily from the list, with reference to the user ID assigned to himself.

While in the above explanation the issuance of user ID, etc. is supposed to be carried out on the server device 20 side, it is also possible to cope with a case in which the issuance of user ID, etc. is made on the side of the respective digital integrated apparatuss 10, by constructing the user information as above. Namely, even in a case where the user ID is issued on the digital integrated apparatus 10 side, it is possible to identify the respective users with the user information, because the information combining machine ID and user ID is a unique number to each user.

Moreover, said access right information is information for specifying the user allowed to have access to the image data concerned, and a construction adopting this access right information is effective for image data control. Namely, at the time of registration information serving as access conditions, such as ① readable only by the user who prepared the data, ② readable only by members of the user group (to be defined on said user information table 27d, etc. in advance) who prepared the data, and ③ readable by anybody, etc. are instructed to be inputted from the touch panel 14d. At the time of perusal, the user ID and password are inputted on a user ID input picture as shown in FIG. 14(f) before the list indicating picture is displayed, from an input means 32 such as keyboard, etc. of the perusal device 30. By constructing (the image control system) this way, it becomes possible to limit the image data to be publicized with an intervention of said user authentication means 26. (The user authentication means 26 performs user authentication by referring to the user information table 27d based on the input information from said input means 32.) One of the examples of this construction is a case where a list is prepared only from the attribute information including the user ID input from the input means 32 of said perusal device 30, and the image data available for perusal is limited only to the image data registered by the respective users themselves.

(Embodiment 3)

In this embodiment, the image control system has a construction realized in a way to prepare miniature image of image data on the input device 10 side and add this miniature image to said list indicating picture, in addition to the construction indicated in said first embodiment or second embodiment. Explanation will be given hereafter about the operations in the case of adoption of said construction, only on points different from those in the second embodiment, by using FIG. 3 and FIGS. 7(a), 7(b).

The user's operations on the digital integrated apparatus 10 in this embodiment are the same as those in the case of said second embodiment. Namely, the user first sets the original image on the image input means 12a, inputs his user ID and password by using the operating panel 14b, and then presses the start button 14c (FIG. 7(a), steps S301 to S302 to S303).

While the steps from generation of image data and attribute information with said user's operations up to storing in the buffer are the same as in the case of said second embodiment, miniature image data of the image data concerned is generated by a miniature image generating means 18 based on the image data stored in the buffer, in this embodiment (FIG. 7(a), steps S304 to S305 to S306).

This miniature image data is transferred, by the transfer means 16, to the server device 20 together with the image data and the attribute information, and stored, by the image control means 25 of the server device 20, in the storing means 27 as miniature image file 27a (FIG. 7(a), steps S307 to S308).

Figure 17:
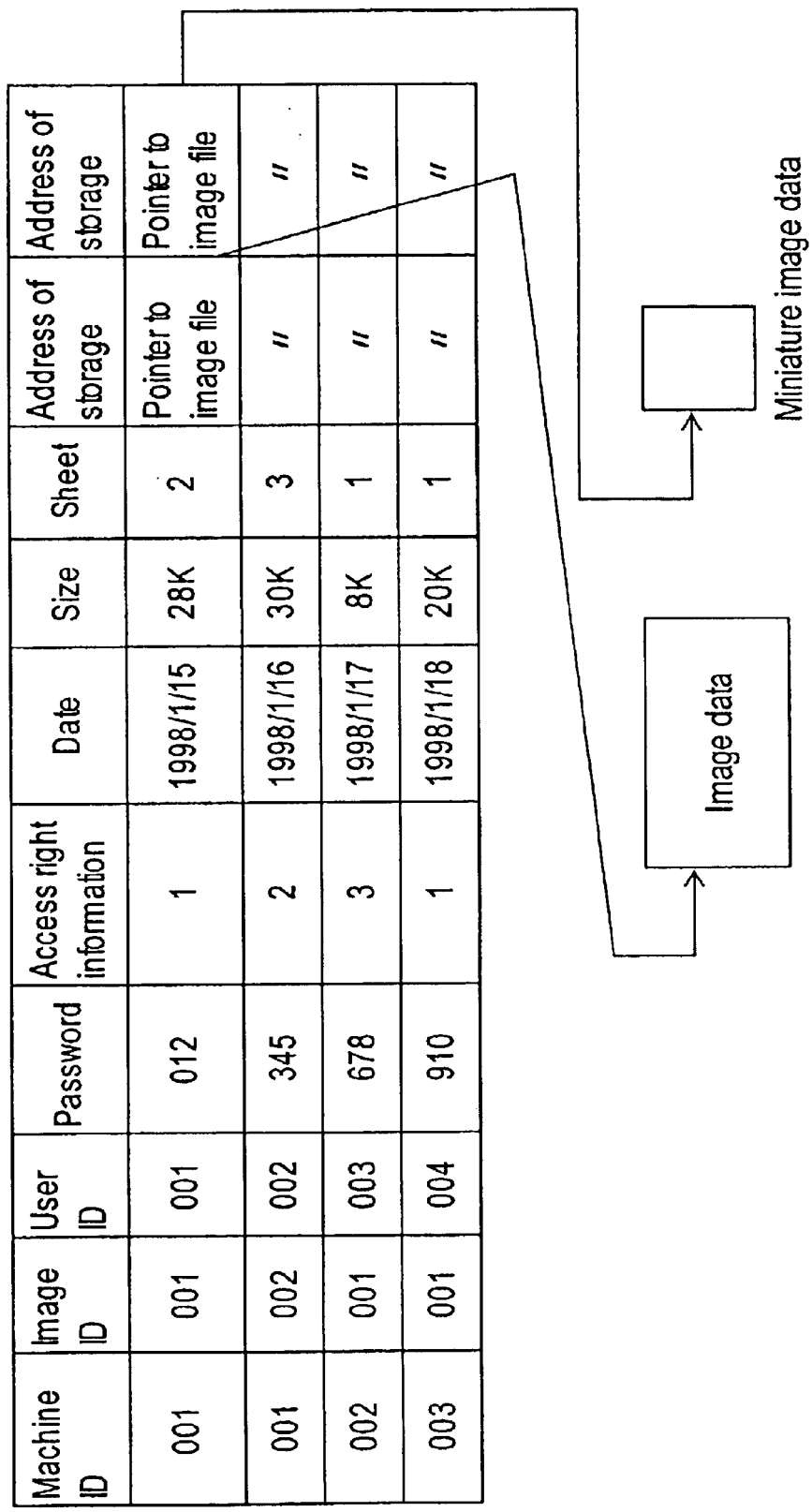
FIG. 17 is an example of construction of the attribute table in the third embodiment of the present invention.

Moreover, the attribute information table 27b of the server device 20 has a construction in which pointer information is added to said miniature image file 27a, as shown in FIG. 17.

By having such construction, it becomes possible to display miniature image as shown in FIG. 14(d) in the list indicating picture displayed on the display means 31 in the processing of perusal, and the user can find out the target image data from the list easily (FIG. 7(a), steps S309~S315).

(Embodiment 4)

Figure 4:
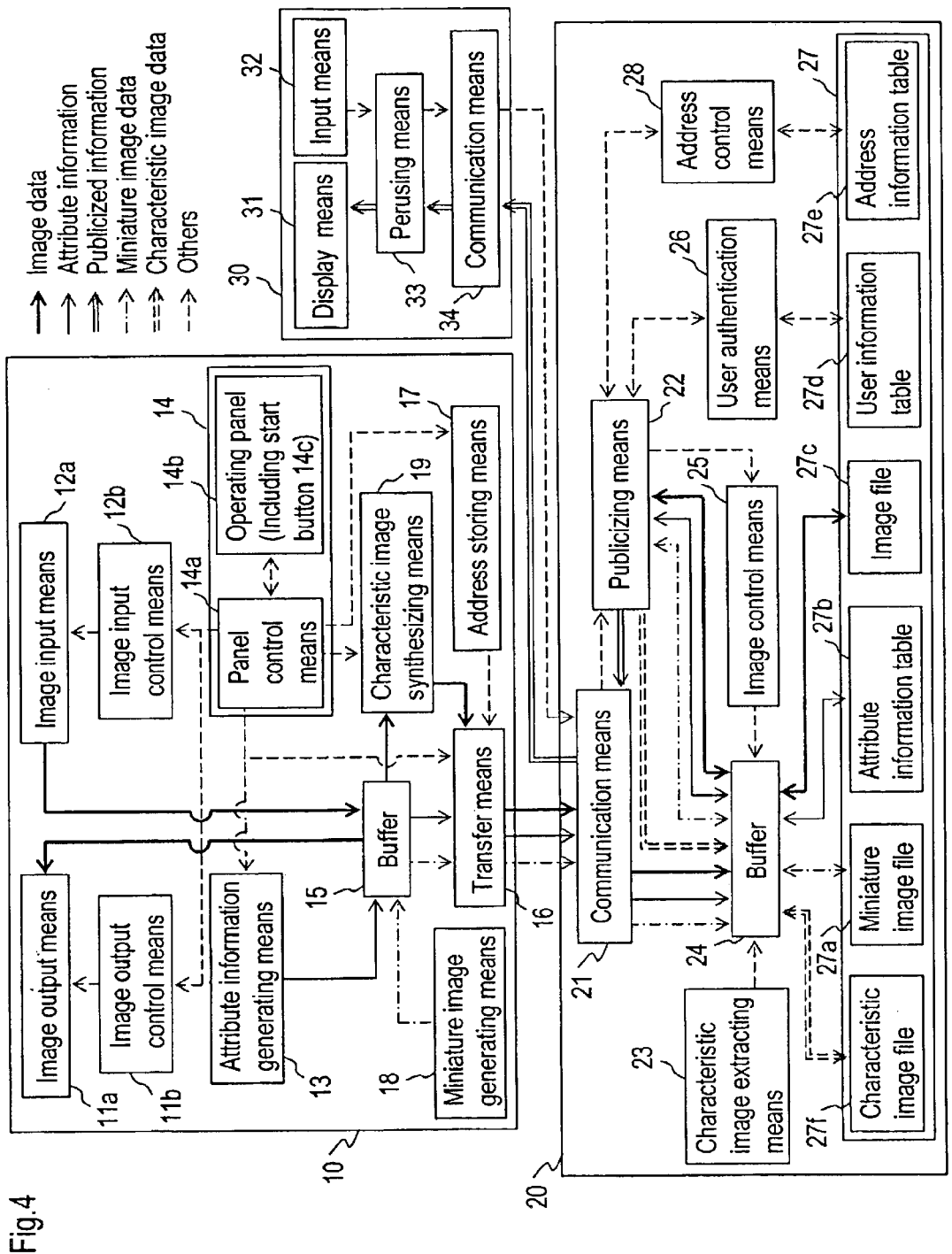
FIG. 4 is a schematic functional block diagram of the fourth embodiment of the present invention.

In this embodiment, (the image control system) has a construction realized in a way to add a characteristic image showing a characteristic part of the respective image data to the list indicating picture at the of perusal, in addition to the construction indicated in either of said first to third embodiments. Explanation will be given hereafter about the operations in the case of adoption of said construction, only on points different from those in the third embodiment, by using FIG. 4 and FIGS. 8(a), 8(b).

Figure 13:
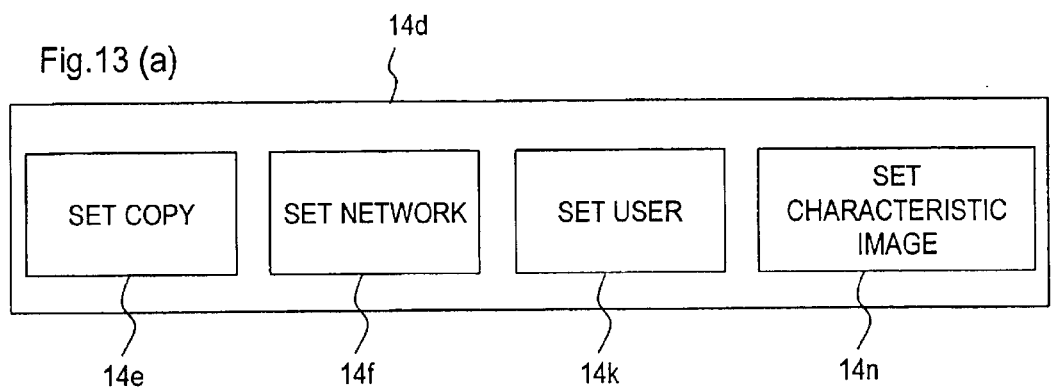
FIGS. 13(a), 13(b) are explanatory drawings of the touch panel in the fourth embodiment of the present invention.
Figure 13:
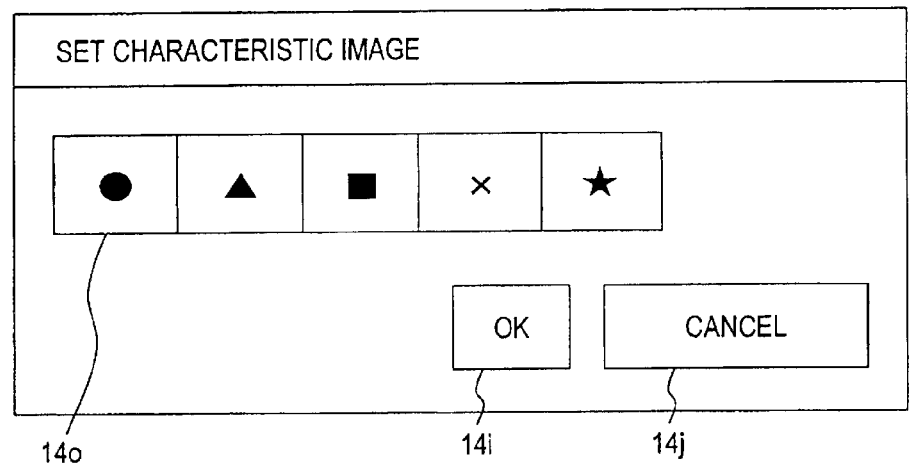

First, in the initial picture of the touch panel 14d is displayed the "SET CHARACTERISTIC IMAGE" button 14n as shown in FIG. 13(a), in addition to the "SET COPY" button 14e, the "SET NETWORK" button 14f and the "SET USER" button 14k indicated in said second embodiment.

In this embodiment, after setting the original image to be registered on the image input means 12a, the user makes this characteristic image setting before pressing the start button 14c.

As this "SET CHARACTERISTIC IMAGE" button 14n is pressed down, the characteristic image setting picture as shown in FIG. 13(b) is displayed on the touch panel 14d. In this picture, the user sets a characteristic image to be combined with the image data, from the characteristic image list 14o indicated in that drawing (FIG. 8(a), steps S401 to S402 to S403).

This setting information is held by the panel control means 14a and, when the start button 14c is pressed, notified to the characteristic image synthesizing means 19. The characteristic image synthesizing means 19 synthesizes said notified characteristic image at prescribed position of the image data stored in the buffer 15 (FIG. 8(a), steps S404~S407).

Figure 8:
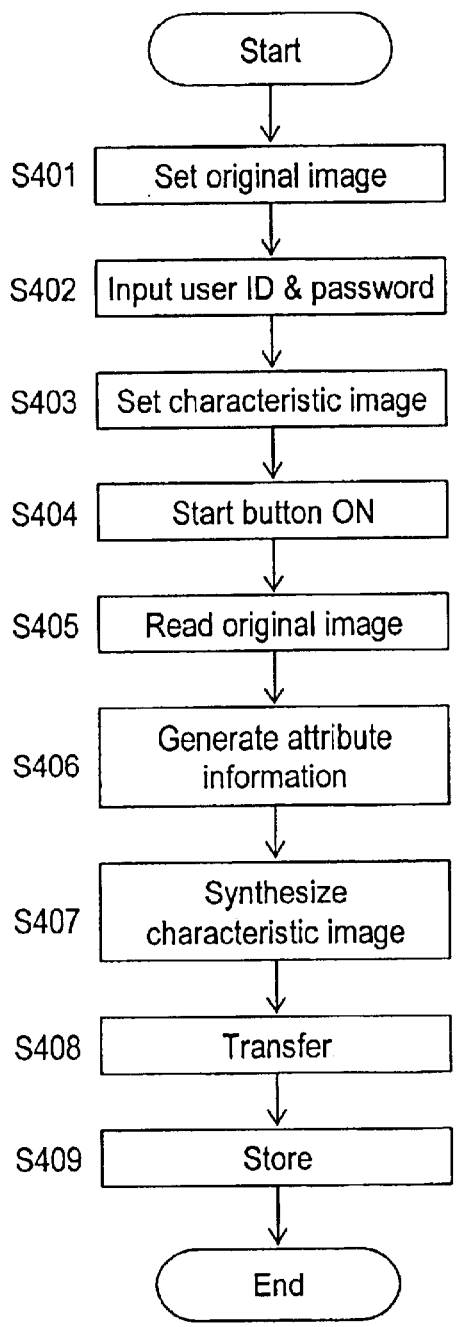
FIGS. 8(a), 8(b) are flow charts in the fourth embodiment of the present invention.
Figure 8:
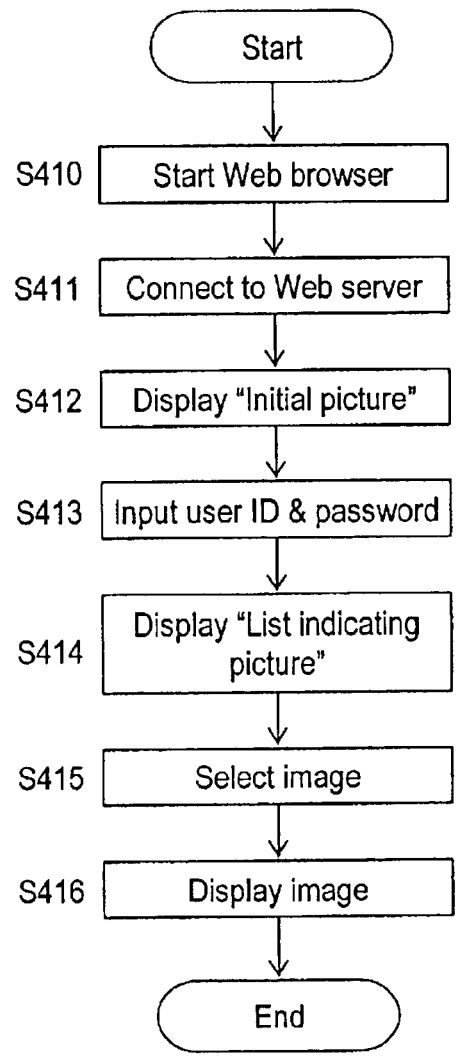

The image data combined with characteristic image is transferred, in the same way as in the case of said third embodiment, to the server device 20 together with the attribute information, and stored in the buffer 24 (FIG. 8(a), step S408).

The characteristic image extracting means 23 of the server device 20 executes characteristic image extraction to said image data combined with characteristic image. Namely, it executes a processing of cutting out image from prescribed position (position where said characteristic image synthesizing means 19 combined the characteristic image) of the image data stored in the buffer 24. The image data cut out here, namely characteristic image data, is stored, by the image control means 25, in the storing means 27 as characteristic image file 27f (FIG. 8(a), step S409).

Figure 18:
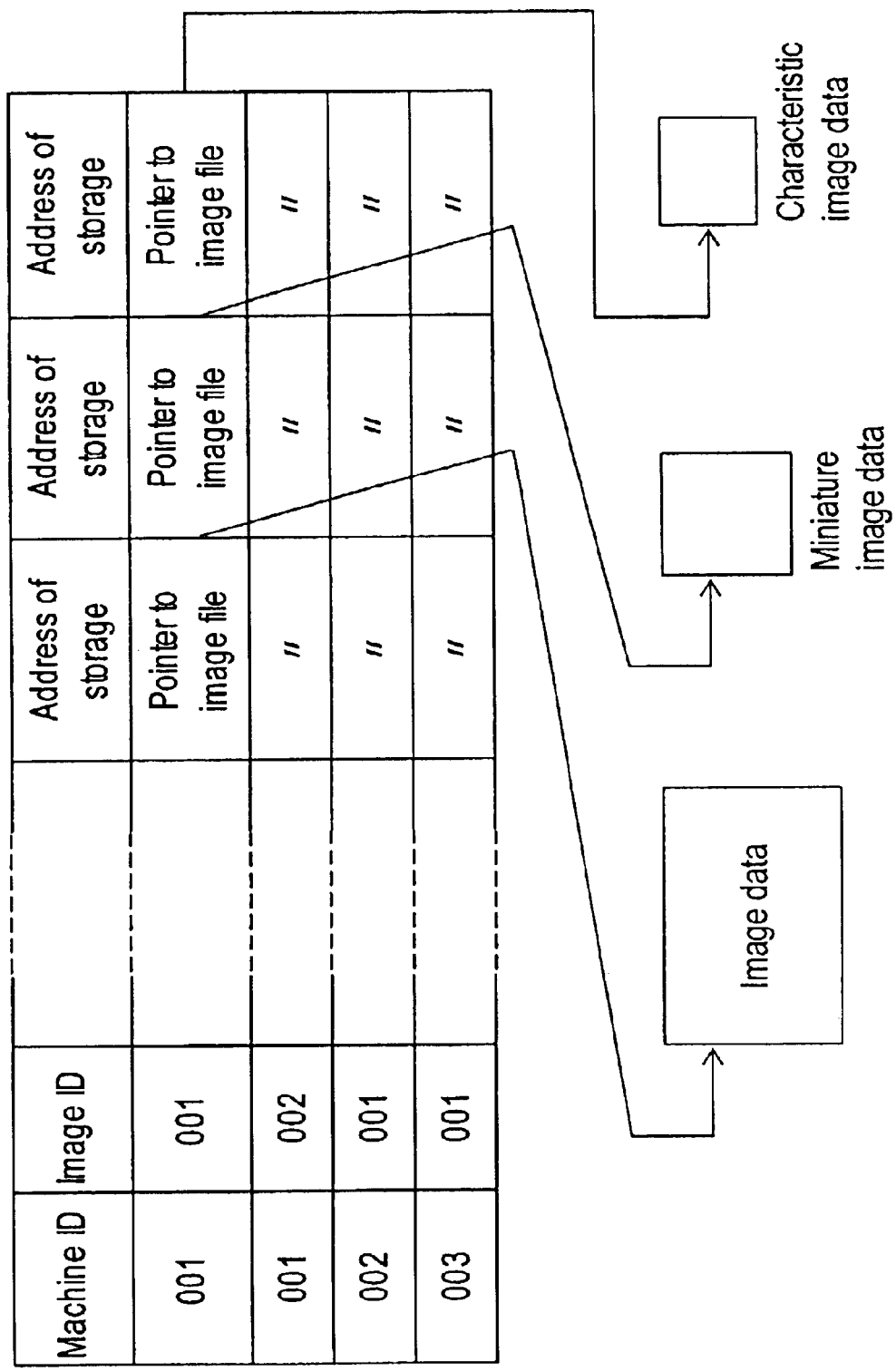
FIG. 18 is an example of construction of the attribute table in the fourth embodiment of the present invention.

Moreover, the attribute information table 27b of the server device 20 has a construction in which pointer information is added to said characteristic image file 27f, as shown in FIG. 18.

By having such construction, it becomes possible to display characteristic image as shown in FIG. 14(e) in the list indicating picture displayed on the display means 31 in the processing of perusal, and the user can thereby find out the target image data from the list easily (FIG. 8(b), steps S410~S416).

While a construction in which the characteristic image is combined on the digital integrated apparatus 10 side is adopted here, this embodiment is not limited to that construction but other construction may also be adopted if only the characteristic image can be displayed in the list indicated on the perusal device 30.

For example, it is also possible to add the characteristic image selected at the operating panel 14b to the attribute information as characteristic image information (also add to the attribute information table 27c in the same way) and, at the time of publication on the server device 20 side, display a characteristic image data based on the characteristic image information concerned in said list.

Furthermore, it is also possible to put a title at prescribed position on the first sheet of the original image, cut out said prescribed position (position where the title is given) of the image data with said characteristic image extracting means 23, and treat this title image as said characteristic image. By so doing, it becomes possible to display characteristic image (title image) in the list, with making synthesis of said characteristic image.

As described above, according to the present invention, the user can register image data in a server device and peruse that data from a perusal device, with a simple operation of pressing the start button provided on the digital integrated apparatus.

Still more, by connecting a printer to this perusal device, the user can also print said image data.

In addition, according to the digital integrated apparatus according to the present invention, adaptation can be made with simple operation using operating panel, even to a case of any change in the network address of the server device.

What is claimed is:

1. An image control system realized by connecting, through a network, a plurality of digital integrated apparatuss provided with an image input means for generating image data by digitizing an original image, a server device provided with a storing means for storing said image data and a publicizing means for publicizing said image data, and a perusal means provided with a perusing means for perusing the information publicized by said publicizing means to one another, comprising, on said digital integrated apparatus side;

an address storing means for storing a network address corresponding to said server device, an attribute information generating means for generating attribute information of said image data, which contains a user ID unique to each user and an access right information to the image data to be stored in the server device, and a transfer means for transferring, when a start button is pressed, said image data based on the network address stored in said address storing means, along with said attribute information including said access right information for specifying whether users other than a user who prepared the image data to be transferred are granted permission to access the image data, in order to register said image data with said access right information into the server device; and comprising, on said server device:

an image control means for registering said image data in said storing means and taking out image data from the storing means based on a request from said publicizing means, and said publicizing means for publicizing a list corresponding to the respective image data, and transmitting, to said perusal means, the image data corresponding to one specified from among the list perused by said perusal means.

2. The image control system as defined in claim 1, wherein said attribute information contains a machine ID unique to each digital integrated apparatuss connected to the network.

3. The image control system as defined in claim 1, wherein said attribute information contains a image ID unique to each of said image data.

4. The image control system as defined in claim 1, wherein said attribute information contains access right information to said image data, which can be set before said image data is registered.

5. The image control system as defined in claim 1, further comprising:

on said digital integrated apparatus side, a miniature image generating means for generating miniature image data of said image data, and said transfer means for transferring said miniature image data together with said image data and attribute information, wherein said attribute information contains pointer information indicating the address of storage of said miniature image data.

6. The image control system as defined in claim 1, further comprising:

on said server device side, a characteristic extracting means for extracting data from a prescribed position of said image data, wherein said attribute information contains pointer information indicating the address of storage of characteristic image data generated by said characteristic extracting means.

7. The image control system as defined in claim 6, further comprising:

on said plurality of digital integrated apparatus side, characteristic image synthesizing means for synthesizing a specific image at a prescribed position of said image data.

8. A plurality of digital integrated apparatus which communicate with a server device over a network, wherein the server device stores image data in and retrieves said image data from a storage means based on access right information, and comprising:

an image input means for generating image data;

an attribute information generating means for generating attribute information of said image data which contains a user ID unique to each user and the access right information to the image data to be stored in the server device;

an address storing means for storing a network address corresponding to the server device connected to a network; and a transfer means for transferring, when a start button is pressed, said image data based on the network address stored in said address storing means, along with said attribute information including said access right information for specifying whether users other than a user who prepared the image data to be transferred are granted permission to access the image data, in order to register said image data with said access right information into the server device.

9. The plurality of digital integrated apparatus as defined in claim 8, wherein said attribute information contains a machine ID unique to each digital integrated apparatus connected to the network.

10. The plurality of digital integrated apparatus as defined in claim 8, wherein said attribute information contains an image ID unique to each of said image data.

11. The plurality of digital integrated apparatus as defined in claim 8, wherein said attribute information contains access right information to said image data, which can be set before said image is registered.

12. The plurality of digital integrated apparatus as defined in claim 8, said each digital integrating apparatus further comprising:

a miniature image generating means for generating miniature image of said image data, and said transfer means for transferring said miniature image data together with said image data and attribute information.

13. The plurality of digital integrated apparatus as defined in claim 8, said each digital integrated apparatus further comprising:

a characteristic synthesizing means for synthesizing a specific image at a prescribed position of said image data.

* * * * *

UNITED STATES PATENT AND TRADEMARK OFFICE
CERTIFICATE OF CORRECTION

PATENT NO.     : 6,819,441 B2
DATED          : November 16, 2004
INVENTOR(S)    : Akito Umebayashi Page 1 of 1

It is certified that error appears in the above-identified patent and that said Letters Patent is hereby corrected as shown below:

Title page,
Item [57], ABSTRACT,
Line 11, change the phrase "submitted to perusing by" to -- submitted to perusal by --;

Column 11,
Lines 12-13, change "apparatuss" to -- apparatus --;
Line 20, change "comprising, on said digital integrated apparatus side" to -- comprising, on said plurality of digital integrated apparatus side --

Signed and Sealed this

Twenty-first Day of June, 2005

JON W. DUDAS
*Director of the United States Patent and Trademark Office*